(12) United States Patent
Zastrow et al.

(10) Patent No.: US 9,206,331 B2
(45) Date of Patent: Dec. 8, 2015

(54) AQUEOUS POLYURETHANE-POLYUREA DISPERSIONS

(75) Inventors: Alfred Zastrow, Dormagen (DE); Reiner Witkowski, Bottrop (DE); Ralf Werner, Leverkusen (DE); Gerald Kurek, Leipzig (DE); Thorsten Rische, Columbus, GA (US); Evgeny Avtomonov, Leverkusen (DE); Harald Kraus, Leverkusen (DE); Henricus Peerlings, Solingen (DE)

(73) Assignee: Covestro Deutschland AG (DE)

( * ) Notice: Subject to any disclaimer, the term of this patent is extended or adjusted under 35 U.S.C. 154(b) by 236 days.

(21) Appl. No.: 13/640,986

(22) PCT Filed: Apr. 13, 2011

(86) PCT No.: PCT/EP2011/055842
§ 371 (c)(1),
(2), (4) Date: Feb. 22, 2013

(87) PCT Pub. No.: WO2011/128382
PCT Pub. Date: Oct. 20, 2011

(65) Prior Publication Data
US 2013/0144007 A1    Jun. 6, 2013

(30) Foreign Application Priority Data
Apr. 14, 2010 (EP) ..................... 10003942

(51) Int. Cl.
| | | |
|---|---|---|
| C08G 18/08 | (2006.01) | |
| C08G 18/28 | (2006.01) | |
| C08J 3/00 | (2006.01) | |
| C08K 3/20 | (2006.01) | |
| C08L 75/00 | (2006.01) | |
| C09D 175/06 | (2006.01) | |
| C09J 175/04 | (2006.01) | |
| C09D 175/04 | (2006.01) | |
| C08G 18/12 | (2006.01) | |
| C08G 18/10 | (2006.01) | |
| C08G 18/42 | (2006.01) | |
| C08G 18/72 | (2006.01) | |
| C08G 18/73 | (2006.01) | |
| C09J 175/06 | (2006.01) | |

(52) U.S. Cl.
CPC .......... *C09D 175/06* (2013.01); *C08G 18/0823* (2013.01); *C08G 18/0828* (2013.01); *C08G 18/10* (2013.01); *C08G 18/12* (2013.01); *C08G 18/283* (2013.01); *C08G 18/4238* (2013.01); *C08G 18/722* (2013.01); *C08G 18/73* (2013.01); *C09D 175/04* (2013.01); *C09J 175/04* (2013.01); *C09J 175/06* (2013.01); *C08G 2170/80* (2013.01)

(58) Field of Classification Search
USPC .......... 524/589, 590, 591, 839, 840; 523/324, 523/326, 340, 343, 344, 348
See application file for complete search history.

(56) References Cited

U.S. PATENT DOCUMENTS

| | | | |
|---|---|---|---|
| 3,491,050 A | 1/1970 | Keberle et al. | |
| 4,108,814 A | 8/1978 | Reiff et al. | |
| 4,730,021 A | 3/1988 | Zom et al. | |
| 4,857,565 A * | 8/1989 | Henning et al. | ............... 523/343 |
| 5,684,081 A | 11/1997 | Dannhorn et al. | |
| 2004/0034162 A1 | 2/2004 | Laas et al. | |
| 2005/0149110 A1 | 7/2005 | Wholey et al. | |
| 2007/0049684 A1 | 3/2007 | Rische et al. | |

FOREIGN PATENT DOCUMENTS

| | | |
|---|---|---|
| CA | 2253119 A1 | 5/1999 |
| DE | 1694062 U | 3/1955 |
| DE | 1953348 U | 1/1967 |
| DE | 1570602 A1 | 8/1969 |
| DE | 1570615 C3 | 5/1975 |
| DE | 2446440 C3 | 4/1981 |
| EP | 0167188 B1 | 12/1988 |
| EP | 0308115 B1 | 12/1992 |
| EP | 0189945 B2 | 11/1994 |
| EP | 0753531 B1 | 3/2003 |
| EP | 916647 B1 | 1/2005 |
| EP | 1699382 A1 | 9/2006 |
| EP | 2177551 A1 | 4/2010 |
| GB | 1128568 A | 9/1968 |
| WO | WO-01/88006 A1 | 11/2001 |
| WO | WO-2007022885 A1 | 3/2007 |

OTHER PUBLICATIONS

International Search Report for PCT/EP2011/055842 mailled Aug. 3, 2011.
International Preliminary Report on Patentability for PCT/EP2011/055842 dated Oct. 16, 2012.

* cited by examiner

*Primary Examiner* — Patrick Niland
(74) *Attorney, Agent, or Firm* — Drinker Biddle & Reath LLP (57) ABSTRACT

The invention relates to a method for producing aqueous polyurethane-polyurea dispersions, aqueous polyurethane-polyurea dispersions produced by this method and their use to produce coating agents and adhesives.

7 Claims, 7 Drawing Sheets

Figure 1:
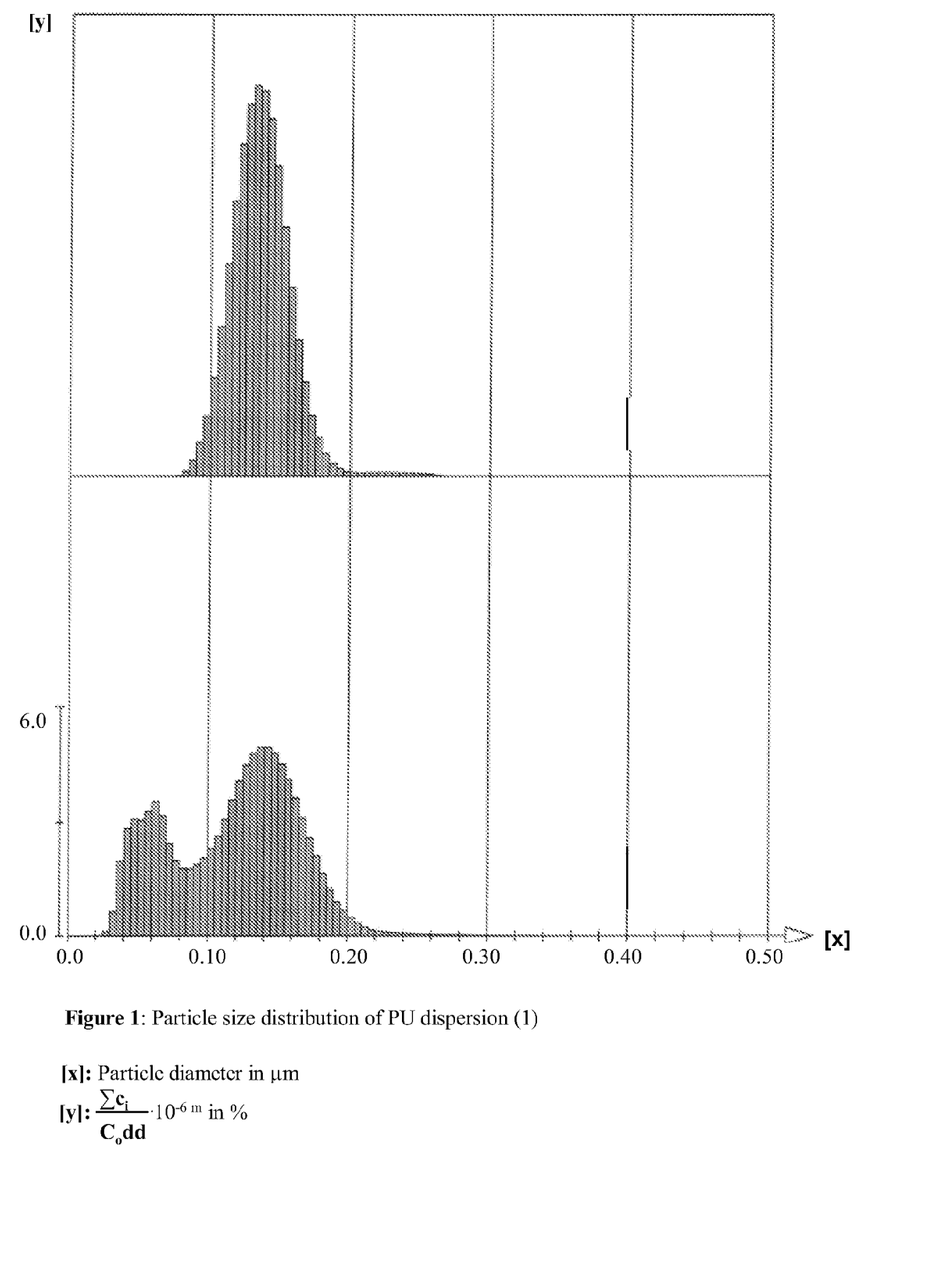

Figure 1: Particle size distribution of PU dispersion (1)

[x]: Particle diameter in μm

[y]: $\dfrac{\sum c_i}{C_o dd} \cdot 10^{-6\,m}$ in %

Figure 2:
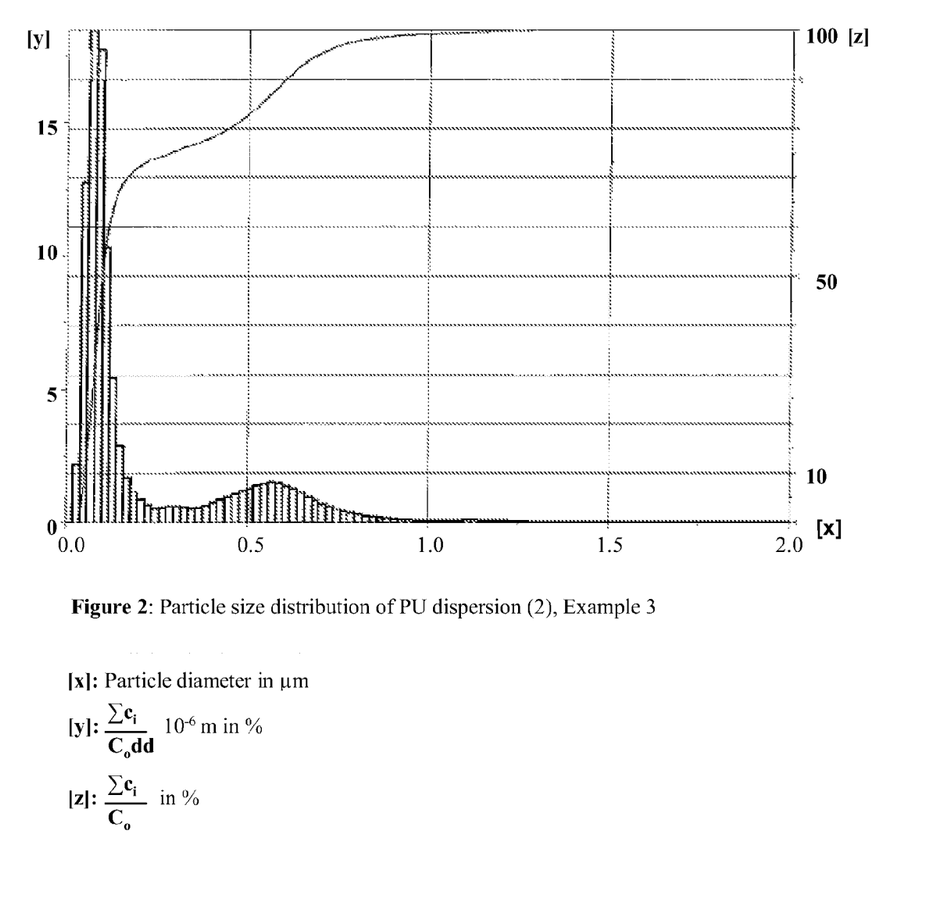

Figure 2: Particle size distribution of PU dispersion (2), Example 3

[x]: Particle diameter in μm

[y]: $\dfrac{\sum c_i}{C_o dd}$ $10^{-6}$ m in %

[z]: $\dfrac{\sum c_i}{C_o}$ in %

Figure 3:
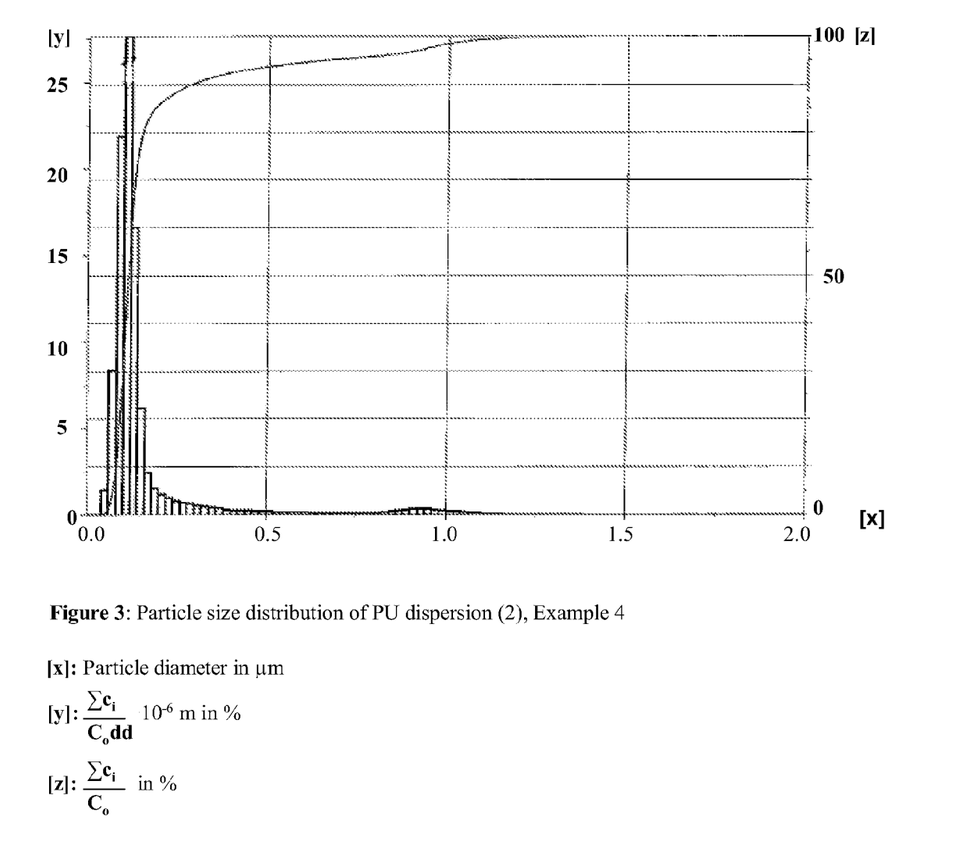

Figure 3: Particle size distribution of PU dispersion (2), Example 4

[x]: Particle diameter in μm

[y]: $\dfrac{\Sigma c_i}{C_o dd}$ $10^{-6}$ m in %

[z]: $\dfrac{\Sigma c_i}{C_o}$ in %

Figure 4:
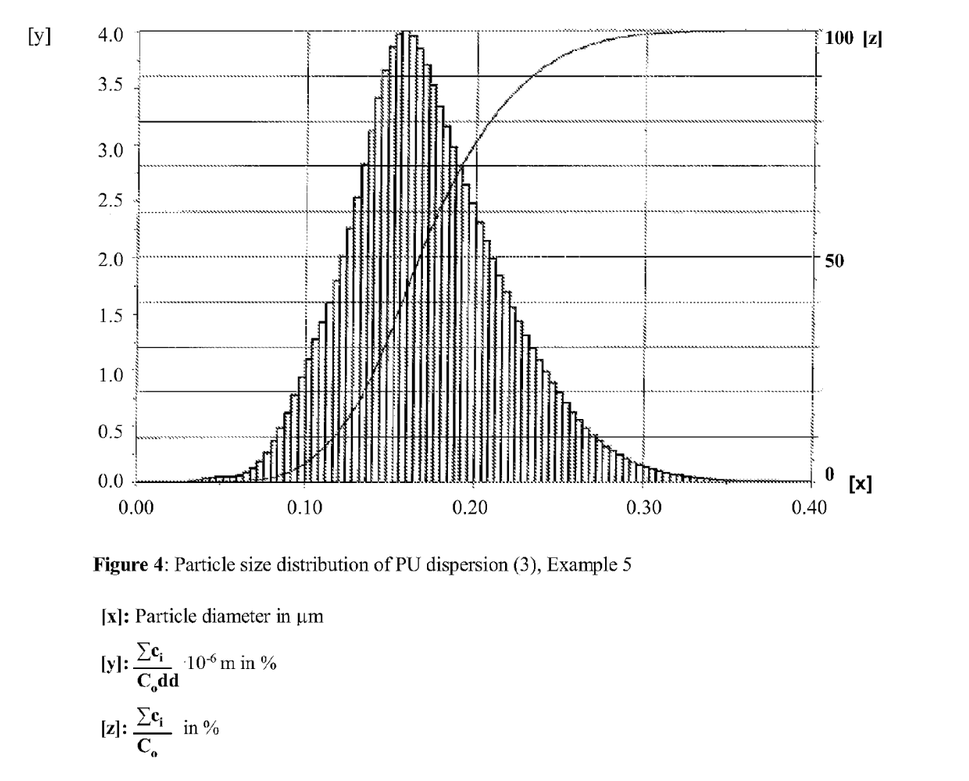

Figure 4: Particle size distribution of PU dispersion (3), Example 5

[x]: Particle diameter in μm

[y]: $\dfrac{\Sigma c_i}{C_o dd} \cdot 10^{-6}$ m in %

[z]: $\dfrac{\Sigma c_i}{C_o}$ in %

Figure 5:
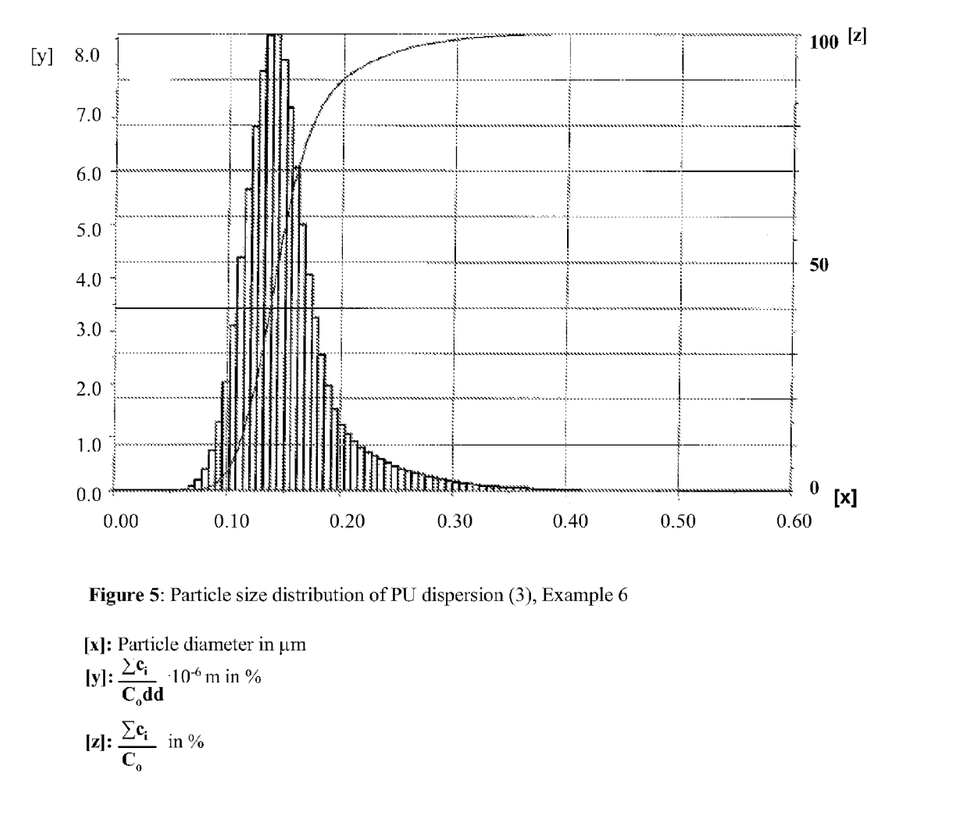

Figure 5: Particle size distribution of PU dispersion (3), Example 6

[x]: Particle diameter in μm

[y]: $\dfrac{\sum c_i}{C_o dd} \cdot 10^{-6}$ m in %

[z]: $\dfrac{\sum c_i}{C_o}$ in %

Figure 6:
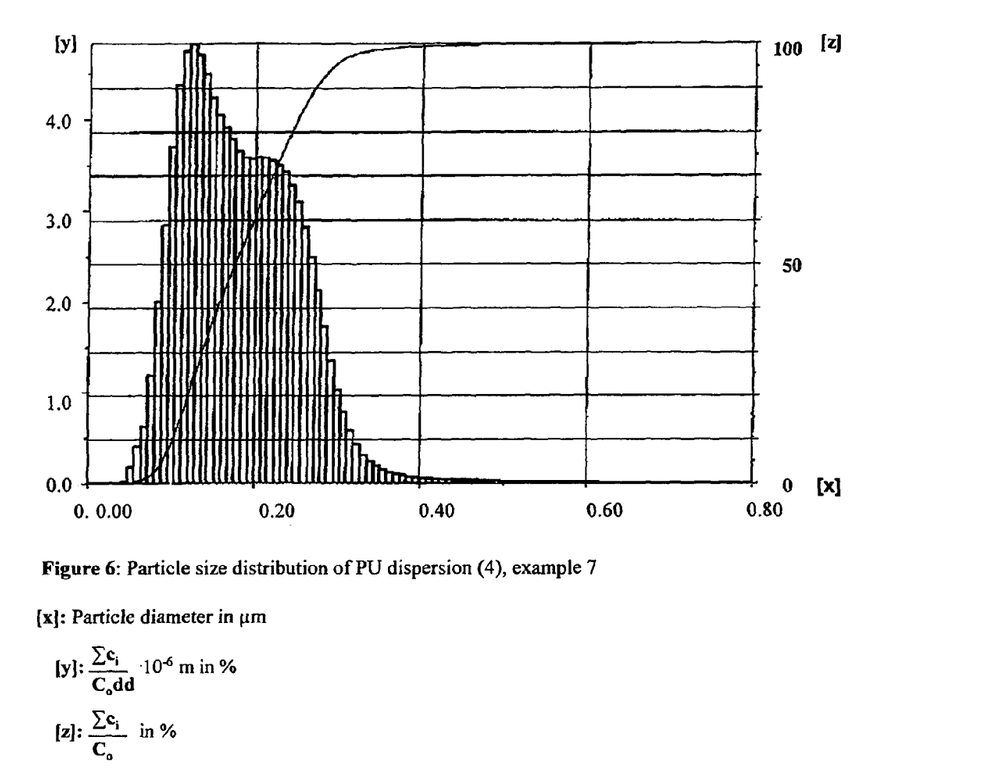

Figure 6: Particle size distribution of PU dispersion (4), example 7

[x]: Particle diameter in μm

[y]: $\dfrac{\Sigma c_i}{C_o dd} \cdot 10^{-6}$ m in %

[z]: $\dfrac{\Sigma c_i}{C_o}$ in %

Figure 7:
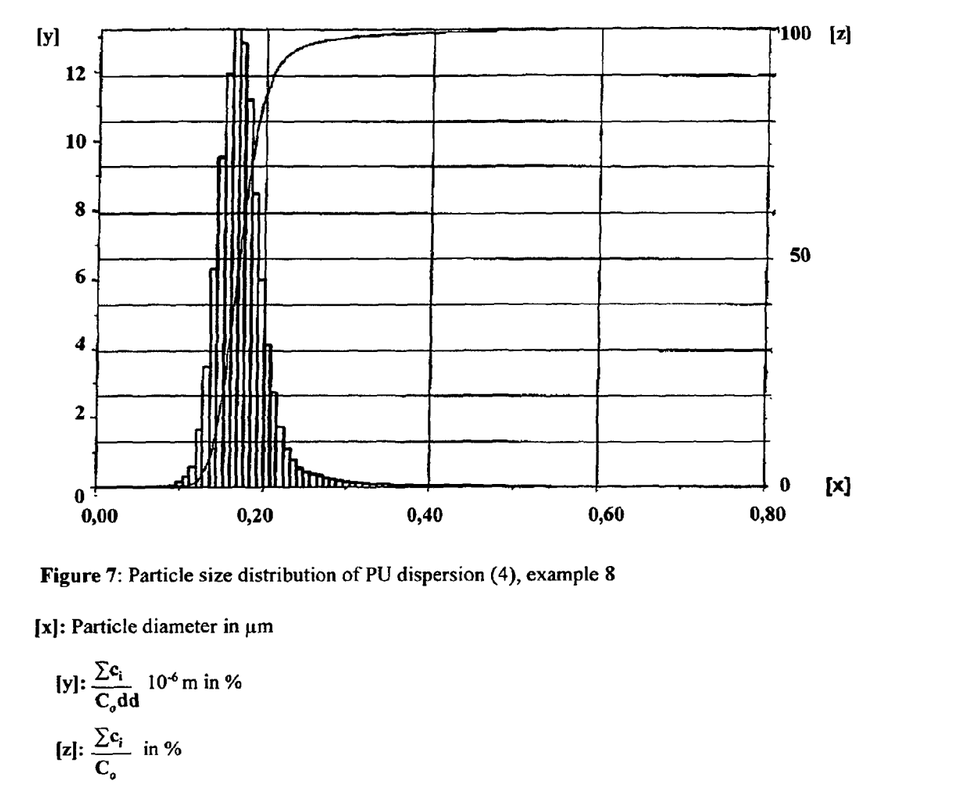

Figure 7: Particle size distribution of PU dispersion (4), example 8

[x]: Particle diameter in µm

[y]: $\dfrac{\Sigma c_i}{C_o dd}$ $10^{-6}$ m in %

[z]: $\dfrac{\Sigma c_i}{C_o}$ in %

AQUEOUS POLYURETHANE-POLYUREA DISPERSIONS

The invention relates to a method for producing aqueous polyurethane-polyurea dispersions, aqueous polyurethane-polyurea dispersions produced by this method and their use to produce coating agents and adhesives.

Aqueous binders, in particular polyurethane-polyurea (PU) dispersions, are increasingly being used in the coating, sealing and bonding of substrates. Unlike many other aqueous binder classes, PU dispersions are characterised above all by a high resistance to chemicals and water, a high mechanical load-bearing capacity, as well as high tensile strength and extensibility. These requirements are largely met by polyurethane-polyurea dispersions of the prior art. The systems mentioned therein can be self-emulsifying because of hydrophilic groups, in other words they can be dispersed in water without the aid of external emulsifiers, and have a monomodal or multimodal particle size distribution.

The production of aqueous PU dispersions is known in principle. The prepolymer mixing method and the acetone method are the methods for producing PU dispersions which are known from the prior art and are used in industry. In comparison to the prepolymer mixing method, higher-quality and solvent-free PU dispersions, which are characterised in particular by higher molecular weights, lower hydrophilicity and narrower particle size distributions and hence better performance in the area of paint binders and adhesives, can be produced by the conventional acetone method. With the constantly growing demands on PU dispersions, which for ecological reasons are increasingly replacing PU coating agents and adhesives containing organic solvents in many areas, it is emerging that the conventionally used acetone method is no longer sufficiently good in terms of its efficiency, in particular space-time yield and energy input, and that the product quality and consistency achievable by the conventional acetone method do not always meet market requirements any longer. A further increase in the efficiency of the method would therefore be desirable, in order to reduce the energy and equipment resources used and to produce polyurethane-polyurea dispersions per unit time and per reactor capacity which contain polyurethane-polyurea polymers characterised by a particularly narrow particle size distribution and by high molecular weights of the polyurethane chains. These could simplify application processes, for example, and open up access to completely new applications or fields of application.

The production of polyurethane dispersions by the acetone method is already described in DE-A 1 570 602, DE-A 1 570 615 and DE-A 1 694 062. As has already been disclosed in EP-A 1 669 382, particle size distributions are conventionally influenced by the degree of hydrophilisation in the polymer chain. With an otherwise identical chemical composition, an increase in the number of hydrophilic groups leads to PU dispersions having a lower average particle size and narrower particle size distribution. However, increasing the hydrophilicity of the PU dispersion and the resulting coatings has a negative influence on their applicational properties, particularly with regard to the water resistance and waterproofness of the coatings. Thus according to the knowledge of the prior art a chemical modification of the PU dispersion does not lead to the desired improvements in properties. DE-A 1 570 602 describes a method in which the organic solvent can be removed following the dispersion step in water or at the same time as the dispersion step in water, even under vacuum. DE-A 1 570 602 does not teach how to increase the efficiency of the method and to produce higher-quality PU dispersions having improved properties, such as for example narrower particle size distributions, with a higher degree of uniformity.

An object of the present invention was therefore to provide a particularly efficient and resource-conserving method for producing polyurethane-polyurea (PU) dispersions, which allows PU dispersions to be obtained in larger quantities in relation to a given unit time and reactor capacity with formation of small quantities of by-products.

An object of the present invention was therefore to provide a particularly efficient and resource-conserving method for producing polyurethane-polyurea (PU) dispersions, which allows PU dispersions to be obtained in larger quantities in relation to a given unit time and reactor capacity, wherein the polyurethane-polyurea polymers present in the PU dispersion are characterised by a particularly narrow and uniform particle size distribution and by high molecular weights of the polyurethane-polyurea chains.

The aforementioned objects were achieved by the subject matter of the invention.

The present invention therefore provides a method for producing aqueous polyurethane-polyurea dispersions, wherein in a first step (I) an isocyanate-functional prepolymer free from urea groups is produced by complete or partial reaction of compounds selected from the group comprising A) polyisocyanates,
B) polyols having number-average molecular weights of 200 to 8000 g/mol,
C') low-molecular-weight compounds having a molecular weight of 60 to 400, which in total have two or more hydroxyl groups,
D') optionally compounds having a hydroxyl group,
E) isocyanate-reactive, ionically or potentially ionically hydrophilising compounds,
F) isocyanate-reactive, non-ionically hydrophilising compounds, optionally already in at least one organic solvent, or in a second step (II), if not in step (I), this isocyanate-functional prepolymer is dissolved in at least one organic solvent in such a way that a solution of the isocyanate-functional prepolymer is produced in a concentration of 20 wt. % to 70 wt. %, relative to all components of the solution,
in a third step (III) the optional addition of
C'') low-molecular weight compounds having a molecular weight of 60 to 400, which in total have two or more amino groups and/or hydroxyl groups, or
D'') optionally compounds having an amino group and/or hydroxyl group takes place and then dispersion takes place by mixing water with the polymer solution with simultaneous distillation of the organic solvent in a dispersion and distillation unit, with the proviso that the volumetric content of the dispersion and distillation unit is 50 vol. % to 95 vol. %, and then a largely solvent-free polyurethane-polyurea dispersion having a residual content of organic solvent of 0.0 wt. % to 5 wt. % and a concentration of polyurethane-polyurea polymer particles of 20 wt. % to 70 wt. %, relative in each case to all components of the polyurethane-polyurea dispersion, is obtained.

In another embodiment, the present invention therefore provides a method for producing aqueous polyurethane-polyurea dispersions, wherein in a first step (I) an isocyanate-functional prepolymer free from urea groups is produced by complete or partial reaction of compounds selected from the group comprising
A) polyisocyanates,
B) polyols having number-average molecular weights of 200 to 8000 g/mol, C') low-molecular-weight compounds having a molecular weight of 62 to 400, which in total have two or more hydroxyl groups, D') optionally compounds having a hydroxyl group, E) isocyanate-reactive, ionically or potentially ionically hydrophilising compounds, F) isocyanate-reactive, non-ionically hydrophilising compounds, optionally already in at least one organic solvent, or in a second step (II), if not in step (I), this isocyanate-functional prepolymer is dissolved in at least one organic solvent in such a way that a solution of the isocyanate-functional prepolymer is produced in a concentration of 20 wt. % to 70 wt. %, relative to all components of the solution, in a third step (III) the optional addition of C") low-molecular weight compounds having a molecular weight of 32 to 400, which in total have two or more amino groups and/or hydroxyl groups, or D") optionally compounds having an amino group takes place and then dispersion takes place by mixing water with the polymer solution with simultaneous distillation of the organic solvent in a dispersion and distillation unit, with the proviso that the volumetric content of the dispersion and distillation unit is 50 vol. % to 95 vol. %, and then a largely solvent-free polyurethane-polyurea dispersion having a residual content of organic solvent of 0.0 wt. % to 5 wt. % and a concentration of polyurethane-polyurea polymer particles of 20 wt. % to 70 wt. %, relative in each case to all components of the polyurethane-polyurea dispersion, is obtained.

The isocyanate-functional prepolymer is preferably present in a concentration of 25 wt. % to 60 wt. %, particularly preferably in a concentration of 30 wt. % to 55 wt. %, more particularly preferably in a concentration of 35 wt. % to 50 wt. %, relative to all components of the solution.

The volumetric content of the dispersion and distillation unit is preferably 50 vol. % to 80 vol. %, more particularly preferably 55 vol. % to 75 vol. %.

A volumetric content of 100% corresponds to a completely full reactor. The volumetric content to which the dispersion and distillation unit can be filled can vary between 50 vol. % and 95 vol. % of the useable volume and can be checked using suitable devices known to the person skilled in the art, for example by means of a level regulator together with a valve or pump in the transfer line from the reactor.

The residual content of organic solvent is preferably 0.1 wt. % to 4 wt. %, particularly preferably 0.1 wt. % to 3 wt. %, most particularly preferably 0.1 wt. % to 2 wt. %, relative to all components of the polyurethane-polyurea dispersion.

The concentration of polyurethane-polyurea polymer particles is preferably 30 wt. % to 70 wt. %, particularly preferably 35 wt. % to 60 wt. %, more particularly preferably 40 wt. % to 60 wt. %, relative to all components of the polyurethane-polyurea dispersion.

The present invention also provides a method for producing aqueous polyurethane-polyurea dispersions, wherein in a first step (I) an isocyanate-functional prepolymer free from urea groups is produced by complete or partial reaction of compounds selected from the group comprising A) polyisocyanates, B) polyols having number-average molecular weights of 200 to 8000 g/mol, C') low-molecular-weight compounds having a molecular weight of 60 to 400, which in total have two or more hydroxyl groups, D') optionally compounds having a hydroxyl group, E) isocyanate-reactive, ionically or potentially ionically hydrophilising compounds, F) isocyanate-reactive, non-ionically hydrophilising compounds, optionally already in at least one organic solvent, or in a second step (II), if not in step (I), this isocyanate-functional prepolymer is dissolved in at least one organic solvent in such a way that a solution of the isocyanate-functional prepolymer is produced in a concentration of 30 wt. % to 55 wt. %, relative to all components of the solution, in a third step (III) the optional addition of C") low-molecular weight compounds having a molecular weight of 60 to 400, which in total have two or more amino groups and/or hydroxyl groups, or D") optionally compounds having an amino group and/or hydroxyl group takes place and then dispersion takes place by mixing water with the polymer solution with simultaneous distillation of the organic solvent in a dispersion and distillation unit, with the proviso that the volumetric content of the dispersion and distillation unit is 50 vol. % to 95 vol. %, and then a largely solvent-free polyurethane-polyurea dispersion having a residual content of organic solvent of 0.1 wt. % to 2 wt. % and a concentration of polyurethane-polyurea polymer particles of 40 wt. % to 60 wt. %, relative in each case to all components of the polyurethane-polyurea dispersion, is obtained.

In another embodiment, the present invention also provides a method for producing aqueous polyurethane-polyurea dispersions, wherein in a first step (I) an isocyanate-functional prepolymer free from urea groups is produced by complete or partial reaction of compounds selected from the group comprising A) polyisocyanates, B) polyols having number-average molecular weights of 400 to 8000 g/mol, C') low-molecular-weight compounds having a molecular weight of 62 to 400, which in total have two or more hydroxyl groups, D') optionally compounds having a hydroxyl group, E) isocyanate-reactive, ionically or potentially ionically hydrophilising compounds, F) isocyanate-reactive, non-ionically hydrophilising compounds, optionally already in at least one organic solvent, or in a second step (II), if not in step (I), this isocyanate-functional prepolymer is dissolved in at least one organic solvent in such a way that a solution of the isocyanate-functional prepolymer is produced in a concentration of 30 wt. % to 55 wt. %, relative to all components of the solution, in a third step (III) the optional addition of C") low-molecular weight compounds having a molecular weight of 32 to 400, which in total have two or more amino groups and/or hydroxyl groups, or D") optionally compounds having an amino group and/or hydroxyl group takes place and then dispersion takes place by mixing water with the polymer solution with simultaneous distillation of the organic solvent in a dispersion and distillation unit, with the proviso that the volumetric content of the dispersion and distillation unit is 50 vol. % to 95 vol. %, and then a largely solvent-free polyurethane-polyurea dispersion having a residual content of organic solvent of 0.1 wt. % to 2 wt. % and a concentration of polyurethane-polyurea polymer particles of 40 wt. % to 60 wt. %, relative in each case to all components of the polyurethane-polyurea dispersion, is obtained.

The polyurethane-polyurea (PU) dispersions produced by means of the method according to the invention are characterised in that they have a largely monomodal (i.e. the proportion of particles of a second particle size is less than 5 wt. %) and very narrow particle size distribution (determined by the ultracentrifugation method), whose d50 value is between 10 and 400 nm, preferably between 15 and 350 nm and particularly preferably between 20 and 300 nm, and this particle size distribution of the polyurethane-polyurea particles determined by ultracentrifugation has a degree of non-uniformity U90 of 0.01 to 5, preferably between 0.05 and 3, particularly preferably between 0.1 and 2. The d50 value is a value at which 50 wt. % of all particles are below and the remaining 50 wt. % above this value. The dX value is a value at which X wt. % of all particles are below this dX value and (100–X) wt. % of all particles are above this value. The degree of non-uniformity U90 is the ratio (d90-d10)/d50. If a dispersion contains particles exclusively of one size, the U90 value is equal to zero. The more uniform a particle size distribution, the lower the U90 value. With a broad and/or asymmetrical particle size distribution the U90 value is significantly greater than 5. It is also possible to use other methods of particle size determination which allow values to be obtained which can be readily compared or correlated with the ultracentrifugation method and which allow the statistical distributions to be measured.

Suitable polyisocyanates of component A) are the aromatic, araliphatic, aliphatic or cycloaliphatic polyisocyanates known per se to the person skilled in the art and having an NCO functionality of preferably ≥2, which can optionally also have iminooxadiazine dione, isocyanurate, uretdione, urethane, allophanate, biuret, urea, oxadiazine trione, oxazolidinone, acyl urea and/or carbodiimide structures. These can be used individually or in any mixtures with one another.

Examples of suitable polyisocyanates are butylene diisocyanate, pentamethylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof having any isomer content, isocyanatomethyl-1,8-octane diisocyanate, 1,4-cyclohexylene diisocyanate, isomeric xylylene diisocyanates, 1,4-phenylene diisocyanate, 2,4- and/or 2,6-toluoylene diisocyanate or derivatives thereof hydrogenated at the aromatic ring, 1,5-naphthylene diisocyanate, 2,4'- or 4,4'-diphenylmethane diisocyanate, triphenylmethane-4,4',4''-triisocyanate or derivatives based on the aforementioned diisocyanates having a uretdione, isocyanurate, urethane, allophanate, biuret, iminooxadiazine dione and/or oxadiazine trione structure with more than 2 NCO groups. Mixtures of the polyisocyanates can be used as well.

4-Isocyanatomethyl-1,8-octane diisocyanate (nonane triisocyanate) for example can be cited as an example of a non-modified polyisocyanate having more than 2 NCO groups per molecule.

They are preferably polyisocyanates or polyisocyanate mixtures of the aforementioned type having exclusively aliphatically and/or cycloaliphatically bonded isocyanate groups.

Hexamethylene diisocyanate, isophorone diisocyanate, the isomeric bis-(4,4'-isocyanatocyclohexyl)methanes and mixtures thereof are particularly preferred.

Polyols suitable for use as compounds B) preferably have a number-average molecular weight Mn of 400 to 8000, particularly preferably 600 to 3000. Their hydroxyl value is 22 to 400 mg KOH/g, preferably 30 to 200 mg KOH/g and particularly preferably 40 to 160 mg KOH/g, and they have an OH functionality of 1.5 to 6, preferably 1.8 to 3 and particularly preferably 2.

Polyols within the meaning of the present invention are the organic polyhydroxyl compounds known in polyurethane paint and adhesives technology, such as for example the conventional polyester polyols, polyacrylate polyols, polyurethane polyols, polycarbonate polyols, polyether polyols, polyesterpolyacrylate polyols and polyurethane polyacrylate polyols, polyurethane polyester polyols, polyurethane polyether polyols, polyurethane polycarbonate polyols, polyester polycarbonate polyols, phenol/formaldehyde resins, alone or in mixtures.

Very suitable examples of polyester polyols are the polycondensates of diols and optionally poly(tri,tetra)ols and dicarboxylic and optionally poly(tri,tetra)carboxylic acids or hydroxycarboxylic acids or lactones known per se. In place of the free polycarboxylic acids, the corresponding polycarboxylic anhydrides or corresponding polycarboxylic acid esters of low alcohols can also be used to produce the polyesters. Examples of suitable diols are ethylene glycol, 1,2-propanediol, 1,3-propanediol, 1,4-butanediol as well as other isomeric butanediols, diethylene glycol, triethylene glycol, polyalkylene glycols such as polyethylene glycol, polypropylene glycol, random and block copolymeric poly(ethylene glycol) copoly(propylene glycol)polyols, poly(tetramethylene glycol), copolymeric polyols of alkylene oxides with carbon dioxide, isosorbide isomers, 1,4-cyclohexyl dimethanol, tricyclodecyl dimethanol, 1,5-pentanediol, 1,6-hexanediol, neopentyl glycol, with 1,3-propanediol, 1,4-butanediol, 1,5-pentanediol, 1,6-hexanediol being preferred. Examples of polyols which can optionally also be used include trimethylolpropane, glycerol, erythritol, pentaerythritol, trimethylolbenzene or trishydroxyethyl isocyanurate.

Suitable dicarboxylic acids are for example phthalic acid, isophthalic acid, terephthalic acid, tetrahydrophthalic acid, hexahydrophthalic acid, cyclohexane dicarboxylic acids, succinic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid. Anhydrides of these acids can likewise be used where they exist. For the needs of the present invention the anhydrides are accordingly encompassed by the expression "acid". Monocarboxylic acids, such as for example benzoic acid and hexane carboxylic acid, can also be used, provided that the average functionality of the polyol is higher than 2. Saturated aliphatic or aromatic acids are preferred, such as succinic acid, adipic acid or isophthalic acid. Trimellitic acid can be mentioned here as a polycarboxylic acid which can optionally be incorporated in smaller amounts.

Hydroxycarboxylic acids which can be used as reactants in the production of a polyester polyol having terminal hydroxyl groups are, for example, hydroxycaproic acid, hydroxybutyric acid, hydroxydecanoic acid or hydroxystearic acid. Suitable lactones are caprolactone or butyrolactone, for example.

Difunctional aliphatic polyester polyols B) are preferred, in particular linear polyester diols, such as can be produced in a known manner from aliphatic or cycloaliphatic dicarboxylic acids, such as for example succinic, methyl succinic, glutaric, adipic, pimelic, subaric, azelaic, sebacic, nonanedicarboxylic, decanedicarboxylic, phthalic, isophthalic, tetrahydrophthalic, hexahydrophthalic, terephthalic, cyclohexanedicarboxylic, maleic, fumaric, malonic acid or mixtures thereof with polyhydric alcohols, such as for example 1,2-propanediol, di-, tri-, tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol or mixtures thereof. In place of the free polycarboxylic acid, the corresponding polycarboxylic anhydrides or corresponding polycarboxylic acid esters of low alcohols or mixtures thereof can also be used to produce the polyesters.

Difunctional aliphatic polyester polyols B) based on succinic acid, adipic acid, phthalic acid or isophthalic acid and 1,4-butanediol, 1,6-hexanediol, 1,2-ethanediol, diethylene glycol or 2,2-dimethyl-1,3-propanediol are particularly preferred.

Difunctional aliphatic polyester polyols B) based on adipic acid and 1,4-butanediol, 1,6-hexanediol, 1,2-ethanediol, diethylene glycol or 2,2-dimethyl-1,3-propanediol are most particularly preferred.

It is immaterial whether the alcohols and/or carboxylic acid used were produced from petrochemical raw materials or on the basis of biotechnological processes.

Polycarbonates containing hydroxyl groups and having a molecular weight Mn of 400 to 6000, preferably 600 to 3000, which are obtainable for example by reacting carbonic acid derivatives, for example diphenyl carbonate, dimethyl carbonate or phosgene, with polyols, preferably diols, are likewise suitable as compounds B). Examples of such diols are ethylene glycol, 1,2- and 1,3-propanediol, 1,3- and 1,4-butanediol, 1,5-pentanediol, 1,5-3-methylpentanediol, 1,6-hexanediol, tricyclodecyl dimethanol isomers, 1,8-octanediol, neopentyl glycol, 1,4-bishydroxymethyl cyclohexane, 2-methyl-1,3-propanediol, 2,2,4-trimethylpentanediol-1,3, dipropylene glycol, polypropylene glycols, dibutylene glycol, polybutylene glycols, bisphenol A, tetrabromobisphenol A but also lactone-modified diols. The diol component preferably contains 40 to 100 wt. % of hexanediol, preferably 1,6-hexanediol and/or hexanediol derivatives, preferably those having ether or ester groups in addition to terminal OH groups, for example products obtained by reacting 1 mol of hexanediol with at least 1 mol, preferably 1 to 2 mol, of caprolactone or by etherifying hexanediol with itself to form dihexylene or trihexylene glycol. Polyether-polycarbonate diols can also be used. The hydroxyl polycarbonates should be substantially linear. However, they can optionally be slightly branched by the incorporation of polyfunctional components, in particular low-molecular-weight polyols. Suitable examples for this purpose are glycerol, trimethylolpropane, hexanetriol-1,2,6, butanetriol-1,2,4, trimethylolpropane, pentaerythritol, quinitol, mannitol, sorbitol, methyl glycoside or 1,3,4,6-dianhydrohexite.

The polytetramethylene glycol polyethers known per se in polyurethane chemistry, which can be produced for example by polymerisation of tetrahydrofuran by means of cationic ring opening, are suitable as polyether polyols corresponding to the definition of compounds B).

Suitable polyether polyols are furthermore polyethers, such as for example the polyols produced from styrene oxide, ethylene oxide, propylene oxide, butylene oxides or epichlorohydrin, in particular propylene oxide, using starter molecules. Copolymers of any mixtures of the aforementioned alkylene oxides are also suitable. Furthermore, copolymers of alkylene oxides and carbon dioxide are also suitable.

The low-molecular-weight polyols C') used to synthesise the polyurethane resins generally bring about a stiffening and/or a branching of the polymer chain. The molecular weight is preferably between 60 and 400. Suitable polyols C') can contain aliphatic, alicyclic or aromatic groups. The low-molecular-weight polyols having up to about 20 carbon atoms per molecule, such as for example ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,5-pentanediol, 1,6-hexanediol, neopentyl glycol, hydroquinone dihydroxyethyl ether, isosorbide, bisphenol A (2,2-bis(4-hydroxyphenyl)propane), hydrogenated bisphenol A (2,2-bis(4-hydroxycyclohexyl)propane), tricyclodecyl dimethanol isomers, as well as trimethylolpropane, glycerol or pentaerythritol and mixtures thereof and optionally also further low-molecular-weight polyols C), are cited here by way of example. Ester diols such as for example α-hydroxybutyl-ε-hydroxyhexanoic acid ester, ω-hydroxyhexyl-γ-hydroxybutyric acid ester, adipic acid-(β-hydroxyethyl)ester or terephthalic acid-bis(β-hydroxyethyl)ester can also be used. 1,4-Butanediol, 1,3-butanediol, 1,6-hexanediol, neopentyl glycol or trimethylolpropane are preferably used as low-molecular-weight polyols C').

Diamines or polyamines and hydrazides, for example ethylene diamine, 1,2- and 1,3-diaminopropane, 1,4-diaminobutane, 1,6-diaminohexane, isophorone diamine, mixtures of isomers of 2,2,4- and 2,4,4-trimethyl hexamethylene diamine, 2-methyl pentamethylene diamine, diethylene triamine, 1,3- and 1,4-xylylene diamine, α,α,α',α'-tetramethyl-1,3- and -1,4-xylylene diamine and 4,4-diaminodicyclohexylmethane, dimethylethylene diamine, hydrazine or adipic acid dihydrazide, can be used as C"). Ethylene diamine, 1,4-diaminobutane, 1,6-diaminohexane, isophorone diamine, diethylene triamine or hydrazine are preferably used. The molecular weight is preferably between 32 and 400. Ethylene diamine, isophorone diamine, hydrazine or mixtures thereof are particularly preferred.

Compounds containing active hydrogen with varying reactivity to NCO groups can also be used in principle as C"), such as compounds which in addition to a primary amino group also have secondary amino groups or which in addition to an amino group (primary or secondary) also have OH groups. Examples thereof are primary/secondary amines such as 3-amino-1-methylaminopropane, 3-amino-1-ethylaminopropane, 3-amino-1-cyclohexylaminopropane, 3-amino-1-methylaminobutane, also alkanol amines such as N-aminoethyl ethanolamine, ethanolamine, 3-aminopropanol, neopentanolamine or diethanolamine. These can be used in the production of the PU dispersion according to the invention as chain extenders and/or for chain termination.

Preferred structural components with differing functional groups C") are ethanolamine, N-aminoethyl ethanolamine or diethanolamine. Diethanolamine or N-aminoethyl ethanolamine is particularly preferred.

The PU dispersions produced by the method according to the invention can also optionally contain structural units D), which are located in each case at the chain ends and which terminate them. These structural units derive on the one hand from monofunctional, NCO-group-reactive compounds, such as monoamines (D"), in particular mono-secondary amines, or monoalcohols (D'). Ethanol, n-butanol, ethylene glycol monobutyl ether, 2-ethyl hexanol, 1-octanol, 1-dodecanol and 1-hexadecanol can be used as compounds D'. Methylamine, ethylamine, propylamine, butylamine, octylamine, laurylamine, stearylamine, isononyl oxypropylamine, dimethylamine, diethylamine, dipropylamine, dibutylamine, N-methylaminopropylamine, diethyl(methyl)aminopropylamine, morpholine, piperidine, or suitable substituted derivatives thereof, amidoamines of diprimary amines and monocarboxylic acids, monoketimes of diprimary amines or primary/tertiary amines, such as N,N-dimethylaminopropylamine, are cited here by way of example as compounds D".

Ionically or potentially ionically hydrophilising compounds E) are understood to be all compounds having at least one isocyanate-reactive group and at least one functionality, such as, for example, —COOY, —SO$_3$Y, —PO(OY)$_2$ (Y for example =H, NH$_4$$^+$, metal cation), —NR$_2$, —NR$_3$$^+$ (R=H, alkyl, aryl), which on interaction with aqueous media enter into a pH-dependent dissociation equilibrium and in this way can be negatively, positively or neutrally charged. Preferred isocyanate-reactive groups are hydroxyl or amino groups.

Suitable ionically or potentially ionically hydrophilising compounds corresponding to the definition of component E) are, for example, mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and salts thereof such as dimethylolpropionic acid, dimethylolbutyric acid, hydroxypivalic acid, N-(2-aminoethyl)-β-alanine, 2-(2-aminoethylamino)ethanesulfonic acid, ethylene diaminepropyl- or -butylsulfonic acid, 1,2- or 1,3-propylene diamine-β-ethylsulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, example 1) and the alkali and/or ammonium salts thereof; the adduct of sodium bisulfite to butene-2-diol-1,4, polyethersulfonate, the propoxylated adduct of 2-butenediol and NaHSO$_3$, described for example in DE-A 2 446 440 (page 5-9, formula I-III), and compounds which contain structural units which can be converted into cationic groups, for example amine-based structural units, such as N-methyl diethanolamine, as hydrophilic structural components. Cyclohexylaminopropane sulfonic acid (CAPS) as described for example in WO-A 01/88006 can also be used as a compound corresponding to the definition of component E).

Preferred ionic or potential ionic compounds E) are those having carboxy or carboxylate and/or sulfonate groups and/or ammonium groups. Particularly preferred ionic compounds E) are those containing carboxyl and/or sulfonate groups as ionic or potentially ionic groups, such as the salts of N-(2-aminoethyl)-β-alanine, 2-(2-aminoethylamino)ethanesulfonic acid or the addition product of IPDI and acrylic acid (EP-A 0 916 647, example 1) and dimethylolpropionic acid or dimethylolbutyric acid.

In a further embodiment, the present invention also provides a method for producing aqueous polyurethane-polyurea dispersions, wherein in a first step (I) an isocyanate-functional prepolymer free from urea groups is produced by complete or partial reaction of compounds selected from the group comprising
A) polyisocyanates,
B) polyols having number-average molecular weights of 200 to 8000 g/mol,
C') low-molecular-weight compounds having a molecular weight of 60 to 400, which in total have two or more hydroxyl groups,
D') optionally compounds having a hydroxyl group,
E') optionally isocyanate-reactive, ionically or potentially ionically hydrophilising compounds selected from the group consisting of mono- and dihydroxycarboxylic acids, mono- and dihydroxysulfonic acids, and mono- and dihydroxyphosphonic acids,
F) isocyanate-reactive, non-ionically hydrophilising compounds,
optionally already in at least one organic solvent, or in a second step (II), if not in step (I), this isocyanate-functional prepolymer is dissolved in at least one organic solvent in such a way that a solution of the isocyanate-functional prepolymer is produced in a concentration of 30 wt. % to 55 wt. %, relative to all components of the solution, in a third step (III) the optional addition of
C") low-molecular weight compounds having a molecular weight of 60 to 400, which in total have two or more amino groups and/or hydroxyl groups,
D") optionally compounds having an amino group and/or hydroxyl group, or
E") optionally isocyanate-reactive, ionically or potentially ionically hydrophilising compounds selected from the group consisting of mono- and diaminocarboxylic acids and salts thereof, mono- and diaminosulfonic acids and salts thereof and mono- and diaminophosphonic acids and salts thereof,
takes place and then dispersion takes place by mixing water with the polymer solution with simultaneous distillation of the organic solvent in a dispersion and distillation unit, with the proviso that the volumetric content of the dispersion and distillation unit is 50 vol. % to 95 vol. %, and then a largely solvent-free polyurethane-polyurea dispersion having a residual content of organic solvent of 0.1 wt. % to 2 wt. % and a concentration of polyurethane-polyurea polymer particles of 40 wt. % to 60 wt. %, relative in each case to all components of the polyurethane-polyurea dispersion, is obtained.

Suitable ionically or potentially ionically hydrophilising compounds corresponding to the definition of component E') are dimethylolpropionic acid, dimethylolbutyric acid, hydroxypivalic acid, malic acid, citric acid, glycolic acid, lactic acid, glycine, alanine, taurine, lysine, 3,5-diaminobenzoic acid, an addition product of IPDI and acrylic acid (EP-A 0 916 647, example 1) and the alkali and/or ammonium salts thereof; the adduct of sodium bisulfite to butene-2-diol-1,4, polyethersulfonate, the propoxylated adduct of 2-butenediol and NaHSO$_3$, described for example in DE-A 2 446 440 (page 5-9, formula I-III), and compounds which contain structural units which can be converted into cationic groups, for example amine-based structural units, such as N-methyl diethanolamine, as hydrophilic structural components.

Suitable ionically or potentially ionically hydrophilising compounds corresponding to the definition of component E") are 2-(2-aminoethylamino)ethanesulfonic acid, N-(2-aminoethyl)-β-alanine, ethylene diaminepropyl- or -butylsulfonic acid, 1,2- or 1,3-propylene diamine-β-ethylsulfonic acid and cyclohexylaminopropane sulfonic acid (CAPS) as described for example in WO-A 01/88006.

Suitable non-ionically hydrophilising compounds corresponding to the definition of component F) are, for example, polyoxyalkylene ethers containing at least one hydroxyl group. These polyethers contain a proportion of 30 wt. % to 100 wt. % of structural units derived from ethylene oxide.

Non-ionically hydrophilising compounds F) are for example also monohydric polyalkylene oxide polyether alcohols having a statistical mean of 5 to 70, preferably 7 to 55 ethylene oxide units per molecule, such as can be obtained in a manner known per se by alkoxylation of suitable starter molecules.

Suitable starter molecules are for example saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as for example diethylene glycol monobutyl ether, unsaturated alcohols such as allyl alcohol, 1,1-dimethyl allyl alcohol or oleic alcohol, aromatic alcohols such as phenol, the isomeric cresols or methoxyphenols, araliphatic alcohols such as benzyl alcohol, anisic alcohol or cinnamic alcohol, secondary monoamines such as dimethylamine, diethylamine, dipropylamine, diisopropylamine, dibutylamine, bis-(2-ethylhexyl)amine, N-methyl- and N-ethylcyclohexylamine or dicyclohexylamine and heterocyclic secondary amines such as morpholine, pyrrolidine, piperidine or 1H-pyrazole. Preferred starter molecules are saturated monoalcohols. Diethylene glycol monobutyl ether is particularly preferably used as the starter molecule.

Suitable alkylene oxides for the alkoxylation reaction are in particular ethylene oxide and propylene oxide, which can be used in the alkoxylation reaction in any sequence or in a mixture.

The polyalkylene oxide polyether alcohols are either pure polyethylene oxide polyethers or mixed polyalkylene oxide polyethers in which at least 30 mol %, preferably at least 40 mol %, of the alkylene oxide units are ethylene oxide units.

Preferred non-ionic compounds are monofunctional mixed polyalkylene oxide polyethers having at least 40 mol % of ethylene oxide units and a maximum of 60 mol % of propylene oxide units.

In contrast to the prior art, in which the process steps of dispersion and distillation normally proceed successively and thus require an elevated use of reactor capacity and energy, in the method according to the invention for producing aqueous polyurethane-polyurea (PU) dispersions the process steps of dispersion and distillation are performed simultaneously, such that larger quantities of PU dispersions are obtained in relation to a given unit time and reactor capacity using reduced energy and equipment resources and with formation of small quantities of by-products. Substantial to the method according to the invention, however, is the fact that, depending on the product, in the production of PU dispersions starting from prepolymer solutions in organic solvents with a concentration of 25 to 55 wt. % relative to all components of the solution, the space-time yield with distillation/dispersion reactor volumetric contents of 50 to 95 vol. % can be increased significantly.

The present invention therefore provides a method for producing aqueous polyurethane-polyurea dispersions, wherein in a first step (I) an isocyanate-functional prepolymer free from urea groups is produced by complete or partial reaction of compounds selected from the group comprising
A) polyisocyanates,
B) polyols having number-average molecular weights of 200 to 8000 g/mol,
C') low-molecular-weight compounds having a molecular weight of 60 to 400, which in total have two or more hydroxyl groups,
D') optionally compounds having a hydroxyl group,
E) isocyanate-reactive, ionically or potentially ionically hydrophilising compounds,
F) isocyanate-reactive, non-ionically hydrophilising compounds,
optionally already in at least one organic solvent, or in a second step (II), if not in step (I), this isocyanate-functional prepolymer is dissolved in at least one organic solvent in such a way that a solution of the isocyanate-functional prepolymer is produced in a concentration of 20 wt. % to 70 wt. %, relative to all components of the solution,
in a third step (III) the optional addition of
C") low-molecular weight compounds having a molecular weight of 60 to 400, which in total have two or more amino groups and/or hydroxyl groups, or
D") optionally compounds having an amino group and/or hydroxyl group
takes place and then dispersion takes place by mixing water with the polymer solution with simultaneous distillation of the organic solvent in a dispersion and distillation unit, with the proviso that the volumetric content of the dispersion and distillation unit is 50 vol. % to 95 vol. %, and then a largely solvent-free polyurethane-polyurea dispersion having a residual content of organic solvent of 0.0 wt. % to 5 wt. % and a concentration of polyurethane-polyurea polymer particles of 20 wt. % to 70 wt. %, relative in each case to all components of the polyurethane-polyurea dispersion, is obtained.

In another embodiment, the present invention therefore provides a method for producing aqueous polyurethane-polyurea dispersions, wherein in a first step (I) an isocyanate-functional prepolymer free from urea groups is produced by complete or partial reaction of compounds selected from the group comprising
A) polyisocyanates,
B) polyols having number-average molecular weights of 400 to 8000 g/mol,
C') low-molecular-weight compounds having a molecular weight of 62 to 400, which in total have two or more hydroxyl groups,
D') optionally compounds having a hydroxyl group,
E) isocyanate-reactive, ionically or potentially ionically hydrophilising compounds,
F) isocyanate-reactive, non-ionically hydrophilising compounds, optionally already in at least one organic solvent, or in a second step (II), if not in step (I), this isocyanate-functional prepolymer is dissolved in at least one organic solvent in such a way that a solution of the isocyanate-functional prepolymer is produced in a concentration of 20 wt. % to 70 wt. %, relative to all components of the solution,
in a third step (III) the optional addition of
C") low-molecular weight compounds having a molecular weight of 32 to 400, which in total have two or more amino groups and/or hydroxyl groups, or
D") optionally compounds having an amino group and/or hydroxyl group
takes place and then dispersion takes place by mixing water with the polymer solution with simultaneous distillation of the organic solvent in a dispersion and distillation unit, with the proviso that the volumetric content of the dispersion and distillation unit is 50 vol. % to 95 vol. %, and then a largely solvent-free polyurethane-polyurea dispersion having a residual content of organic solvent of 0.0 wt. % to 5 wt. % and a concentration of polyurethane-polyurea polymer particles of 20 wt. % to 70 wt. %, relative in each case to all components of the polyurethane-polyurea dispersion, is obtained.

In step (I) of the method according to the invention the substance ratio of isocyanate groups to isocyanate-reactive groups is 1.0 to 3.5, preferably 1.1 to 2.5, particularly preferably 1.1 to 3.0.

The reaction temperature in the first step is between 20 and 130° C., preferably between 40 and 125° C. and particularly preferably between 45 and 125° C.

The constituents of A) to F) not yet added in step (I) are optionally added in step (III).

In step (III) of the method according to the invention the equivalents ratio of isocyanate-reactive groups in the compounds used for chain extension to free isocyanate groups in the prepolymer is between 0 and 150%, preferably between 40 and 110%, particularly preferably between 50 and 120%.

In the method according to the invention keto-functional aliphatic solvents, such as for example acetone or 2-butanone, are preferably used as the organic solvent. Acetone is particularly preferably used. Other solvents such as for example xylene, toluene, cyclohexane, butyl acetate, methoxypropyl acetate, solvents containing ether or ester units, can likewise be used.

In the method according to the invention the space-time yield is increased by 10 to 80%, preferably by 20 to 70% and particularly preferably by 25 to 60%, as compared in each case with a method performed with a low volumetric content.

The catalysts known in polyurethane chemistry can be used to accelerate the isocyanate addition reaction. Dibutyl tin dilaurate (DBTL), dibutyl tin oxide, triethylamine, tin(II) octoate, zinc octoate, 1,4-diazabicyclo[2,2,2]octane (DABCO), 1,4-diazabicyclo[3,2,0]-5-nonene (DBN), 1,4-diazabicyclo[5,4,0]-7-undecene (DBU), bismuth carboxylate, N,N-dimethyl isopropanolamine, N-methyl diethanolamine, triethanolamine, N,N-dimethyl ethanolamine or N-methyl diisopropanolamine is suitable. Dibutyl tin dilaurate and zinc octoate are preferred.

The reaction of components A) to F) to form the prepolymer in step (I) takes place partially or completely, but preferably completely. In this way polyurethane prepolymers containing free isocyanate groups are obtained in bulk or in solution.

If it has not already been performed in the starting molecules, partial or complete salt formation of the groups having an anionic and/or cationic dispersion effect takes place after or during production of the polyurethane prepolymers in step (I). In the case of anionic groups, bases such as tertiary amines, for example trialkylamines having 1 to 12, preferably 1 to 6, C atoms in each alkyl radical, are used to this end. Examples are trimethylamine, triethylamine, methyl diethylamine, tripropylamine, N-methyl or N-ethyl morpholine, methyl diisopropylamine, dimethyl isopropylamine, ethyl diisopropylamine and diisopropyl ethylamine. The alkyl radicals can also bear hydroxyl groups, for example, as is the case with dialkyl monoalkanol, alkyl dialkonol or trialkonol amines. Inorganic bases, such as ammonia or sodium or potassium hydroxide, can also optionally be used as neutralising agents. Triethylamine, triethanolamine, dimethyl ethanolamine or diisopropyl ethylamine are preferred.

The temperature for neutralisation is conventionally 20 to 100° C., preferably 25 to 80° C. and particularly preferably 30 to 80° C.

The amount of bases required for neutralisation is between 50 and 125%, preferably between 60 and 100%, more preferably between 70 and 100%, of the amount of anionic groups. Sulfuric acid dimethyl esters, phosphoric acid or succinic acid are used in the case of cationic groups. Neutralisation can also take place at the same time as dispersion if the dispersion water already contains the neutralising agent.

In process step (II), if not already done or only partially done, the prepolymer obtained is then dissolved with the aid of aliphatic ketones such as for example acetone or 2-butanone, preferably acetone, such that a solution in a concentration of 20 to 70 wt. %, preferably 25 to 60 wt. %, particularly preferably 30 to 55 wt. %, is obtained.

Possible $NH_2$- and/or NH-functional components (C")/(D")/(E) are reacted with the remaining isocyanate groups in step (III) of the method according to the invention. This chain extension/termination can optionally take place in a solvent such as acetone or water for example, before dispersion, during dispersion or after dispersion. Chain extension preferably takes place before dispersion in water.

If water or organic solvents are additionally used as diluting agents for the chain extender, the diluting agent content is 20 to 95 wt. %, preferably 50 to 95 wt. % and particularly preferably 70 to 95%.

If compounds corresponding to the definition of E) with $NH_2$ or NH groups are used for chain extension, the chain extension of the prepolymers preferably takes place before dispersion.

The temperature of the reaction mixture during the chain extension in step (III) of the method according to the invention is between 15 and 70° C., preferably between 30 and 70° C., particularly preferably between 35 and 50° C.

The degree of chain extension, in other words the equivalents ratio of NCO-reactive groups in the compounds used for chain extension to free NCO groups in the prepolymer, is between 0 and 150%, preferably between 40 and 110%, particularly preferably between 40 and 150%, most particularly preferably between 60 and 120%.

Production of the PU dispersion from the prepolymers takes place following chain extension in the final step of the method according to the invention. To this end the dispersion water is mixed with the dissolved and chain-extended polyurethane polymer with intensive shearing, such as for example intensive stirring. The dispersion water is preferably added continuously or discontinuously to the dissolved and chain-extended polyurethane polymer with intensive shearing, such as for example intensive stirring. The dispersion water is at a temperature of between 2 and 99° C., preferably between 20 and 95° C., particularly preferably between 40 and 85° C. and most particularly preferably between 55 and 75° C. At the same time as the dispersion water is added, the organic solvent obtained is distilled in such a way that the content in the dispersion and distillation reactor remains between 50 and 95 vol. %. The pressure in the dispersion and distillation reactor can be between 1 and 2000 mbar, preferably between 50 and 1000 mbar and particularly preferably between 75 and 800 mbar. The pressure can be varied continuously and discontinuously during the distillation and dispersion process, i.e. reduced, increased or alternately reduced and increased. The pressure in the dispersion and distillation reactor is adjusted in such a way that it allows as gentle as possible boiling during the distillation and dispersion process without excessive foaming. The pressure is preferably reduced towards the end of distillation in order for organic solvents to be removed from the dispersion as completely as possible.

It is also possible to perform a cascade distillation, in other words to connect several dispersion and distillation reactors in parallel or in series.

The bottom temperature during the dispersion and distillation process is between 10 and 150° C., preferably between 30 and 100° C., particularly preferably between 40 and 80° C.

The solids content of the PU dispersion is between 20 and 70 wt. %, preferably between 25 and 65 wt. % and particularly preferably between 40 and 55 wt. %.

The PU dispersions produced by the method according to the invention are characterised by fewer by-products, in particular with regard to hydrolysis products of the polyesters and urethane groups, and reduced thermal loading, in particular the polyurethane-polyurea dispersions containing polyester and/or polycarbonate polyols, and by a significantly improved thickening ability with regard to viscosity of 20 to 95%, preferably 30 to 90%, particularly preferably 50 to 85%.

The PU dispersions produced by the method according to the invention can contain antioxidants and/or light stabilisers and/or other auxiliary agents and additives, such as for example emulsifiers, defoamers, thickeners. Finally they can also contain fillers, plasticisers, pigments, carbon black and silica sols, aluminium, clay, flow control agents or thixotroping agents. Depending on the desired properties and intended purpose of the PU dispersions produced by the method according to the invention, the end product can contain up to 70%, relative to the total dry substance, of such fillers.

It is also possible to modify the PU dispersions produced by the method according to the invention with polyacrylates. To this end an emulsion polymerisation of olefinically unsaturated monomers, for example esters of (meth)acrylic acid and alcohols having 1 to 18 C atoms, styrene, vinyl esters or butadiene, is performed in the presence of the polyurethane dispersion, as described for example in DE-A-1 953 348, EP-A-0 167 188, EP-A-0 189 945 and EP-A-0 308 115. The monomers contain one or more olefinic double bonds. In addition the monomers can contain functional groups such as hydroxyl, epoxy, methylol or acetoacetoxy groups.

The present invention also provides coating agents, sealants and adhesives containing the aqueous polyurethane-polyurea dispersions produced by methods according to the invention.

In order to use the PU dispersions produced by the method according to the invention as coating agents, sealants or adhesives, they are used either alone or in combination with other aqueous binders. Such aqueous binders can be synthesised for example from polyester, polyacrylate, polyepoxide or polyurethane polymers. The combination with radiation-curable binders, such as are described for example in EP-A-0 753 531, is also possible. It is likewise possible to blend the PU dispersions produced by the method according to the invention with other anionic or non-ionic dispersions, such as for example polyvinyl acetate, polyethylene, polystyrene, polybutadiene, polyvinyl chloride, polyacrylate and copolymer dispersions.

The present invention also provides the use of the polyurethane-polyurea dispersions produced by the method according to the invention as coating agents, sealants and adhesives for the production of coated, sealed and bonded substrates.

Suitable substrates are for example woven and non-woven textiles, leather, paper, rigid fibre, straw, paper-like materials, wood, glass, plastics of a wide variety of types, ceramics, stone, concrete, bitumen, porcelain, metals or glass fibres.

The polyurethane-polyurea dispersions produced by the method according to the invention are likewise suitable for the production of size or adhesive systems.

The PU dispersions produced by the method according to the invention are stable, capable of being stored and shipped and can be processed at any subsequent time.

Depending on the chosen chemical composition and content of urethane groups, coatings with differing properties are obtained. Thus soft tacky coatings, thermoplastic and rubbery-elastic products of varying degrees of hardness through to glass-hard thermosets can be obtained. The hydrophilicity of the products can likewise vary within certain limits. The elastic products are melt processable at elevated temperatures, for example 100 to 180° C., provided that they are not chemically crosslinked.

EXAMPLES

Unless otherwise stated, all percentages should be understood to be percentages by weight.
Substances and Abbreviations Used:
The solids contents were determined in accordance with DIN EN ISO 3251.

Unless expressly indicated otherwise, NCO contents were determined volumetrically in accordance with DIN EN ISO 11909.

The properties of PU dispersions are determined on free films produced as follows:

The average particle sizes (the number average is given) of the PU dispersions were determined by means of laser correlation spectroscopy (using a Malvern Zetasizer 1000, Malvern Instruments Limited).

The particle size distributions are determined using the method of analytical ultracentrifugation, which is described in detail in the literature:
1. W. Scholtan, H. Lange, Kolloid-Z. u. Z. Polymere 250 (1972) 782
2. H. G. Müller, Colloid Polym Sci 267 (1989) 1113

The distributions obtained are distributions by mass.
The specified viscosities are understood to be flow times, measured in accordance with DIN 53 211 in a 4-mm DIN cup.
The viscosities were determined in accordance with DIN EN ISO 3219/A3.

A) Determination of the Initial Heat Resistance

The initial heat resistance test is performed using one component (without crosslinker).
Test Material/Specimens
a) Renolit film (32052096 Strukton; Rhenolit AG, 67547 Worms, Germany)
  Dimensions: 50×300×0.2 mm
b) Beech (planed)
  Dimensions: 50×140×4.0 mm
Bonding and Measurement The adhesive dispersion is applied to the wood specimen using a 200 μm knife. The surface to be bonded measures 50×110 mm. The drying time for the applied adhesive is at least 3 hours at room temperature. Then the two specimens are placed one on top of the other and joined for 10 s at 77° C. under a pressure of 4 bar.

Immediately afterwards the specimen is conditioned without weight for 3 min at 80° C., then subjected to a load of 2.5 kg perpendicular to the glueline for 5 min at 80° C. (180° peel). The amount by which the bonded joint has detached is measured in millimeters. The initial heat resistance is given in mm/min.

The peel strengths following application of the wet bonding method and the heat activation method can be determined by means of the following methods:

B) Determination of the Peel Strength (Two-Component):

Two-component bonded joint: Adhesive containing 3% crosslinker isocyanate Desmodur® DN (Bayer MaterialScience AG, Leverkusen, DE)
Test Material/Specimens
  a) Beech (planed)
    Dimensions: 30×210×4.0 mm
  b) Rigid PVC laminating film (Benelit® RTF; Benecke-Kaliko AG, Hanover, DE)
    Dimensions: 30×210×0.4 mm
Bonding and Measurement The adhesive dispersion is applied to the beech specimen using a brush. The surface to be bonded measures 30×90 mm. After a drying time of 30 minutes at room temperature a second adhesive film is applied over the first and then dried for 60 minutes at room temperature. Then the two specimens are placed one on top of the other and joined for 10 s at 100° C. under a pressure of 4 bar.

After storing the specimens at room temperature for three days the PVC film is peeled away at an angle of 180° to the glueline at a rate of 30 mm per minute and the force required (=peel strength) is measured. The measurement is performed twice and the average value is given.

C) Thickening Ability Test

In order to test the thickening ability 200.0 g of polyurethane dispersion are placed in a beaker at room temperature. Then 2.0 g of thickening agent (e.g. Borchigel® ALA (Borchers GmbH, Leverkusen, DE)) are added whilst stirring with a 45 mm mixer disc at a speed of about 300 rpm and the mixture is stirred for 30 seconds. Then the mixture is stirred for a further 5 minutes at a speed of 2000 rpm. The viscosity of the dispersion is measured at 23° C. with a HAAKE VT 550 viscometer using an E 100 sensor.

D) Determination of the Elongation Properties of Free Films

The properties of PU dispersions are determined on free films produced as follows:

A release paper is inserted in front of the rear roller of a film casting instrument consisting of two polished rollers, which can be set to a precise distance apart. The distance between the paper and the front roller is set using a feeler gauge. This distance corresponds to the (wet) film thickness of the resulting coating and can be set to the desired thickness of each layer. The coating can also be applied in several consecutive layers.

The individual layers are applied by pouring the products (aqueous formulations are first adjusted to a viscosity of 4500 mPa s by adding ammonia/polyacrylic acid) into the gap between the paper and the front roller and pulling the release paper away vertically downwards, causing the corresponding film to form on the paper. If several layers are to be applied, each individual layer is dried and the paper is inserted again.

The modulus at 100% elongation was determined in accordance with DIN 53504 on films with a thickness greater than 100 μm.

E) Determination of the by-Products

The by-products formed during the dispersion and distillation step, arising from the hydrolysis processes for example, can be determined from extraction samples, which can be taken either from the dispersion obtained or from the dried films, by means of chromatography methods (GC, HPLC, SEC, etc.). The products, which are partially broken down by hydrolysis, have an elevated content of low-molecular-weight substances.

Materials Used

Polyester I: 1,4-Butanediol polyadipate diol, OH value=50
Polyester II: Polyester diol consisting of 1,6-hexanediol, neopentyl glycol and adipic acid, OH value=66
Polycarbonate diol: Polycarbonate diol prepared from 1,6-hexane diol, OH value=50
Polyether: Polypropylene glycol ether, OH value=50
Desmodur® H: Hexamethylene diisocyanate-1,6 (Bayer MaterialScience AG, Leverkusen, Germany)
Desmodur® I: Isophorone diisocyanate (Bayer MaterialScience AG, A volumetric content of 80% is selected prior to distillation. This volumetric content allows for the preparation of the polyurethane polymer with a high yield while retaining enough space in the vessel to prevent formation of foam during the distillation.

Example 1

Comparative Example, PU Dispersion (1) Based on the Standard Acetone Method from DE-A 37,28,140, Example 1

360 g of polyester I are dehydrated at 120° C. under vacuum for 1 hour in a 2.5 l vessel. 23.35 g of Desmodur® H are added at 80° C., followed by 15.30 g of Desmodur® I. The mixture is stirred at 80° C. until a constant isocyanate content of 0.90 to 1.01% is reached. The reaction mixture is dissolved in 800 g of acetone and cooled to 50° C. A solution of 5.8 g of sodium salt of N-(2-aminoethyl)-2-aminoethanesulfonic acid (0.031 mol) and 2.1 g of diethanolamine (0.02 mol) in 55 g of water is added to the homogeneous solution whilst stirring. After 7 minutes the mixture is dispersed by adding 565 g of water heated to 20° C. leading to a volumetric content of 80% prior to destillation. After separating off the acetone by distillation a solvent-free, aqueous polyurethane-polyurea dispersion is obtained with a solids content of 40 wt. % at a volumetric content of 40% and an average particle size in the dispersed phase, determined by laser correlation, of 152 nm. This dispersion exhibited a bimodal particle size distribution: the maximum of the fine fraction in the particle size distribution was 62 nm, the maximum of the coarse fraction was 140 nm. The d50 value is 105 nm. The non-uniformity value U90 is 0.9 (FIG. 1, bottom).

Example 2

PU Dispersion (1) by Methods According to the Invention 497 g of polyester I are dehydrated at 120° C. under vacuum for 1 hour in a 2.5 l vessel. 32.2 g of Desmodur® H are added at 80° C., followed by 21.1 g of Desmodur® I. The mixture is stirred at 80° C. until a constant isocyanate content of 0.90 to 1.01% is reached. The reaction mixture is dissolved in 1104 g of acetone and cooled to 50° C. A solution of 8.0 g of sodium salt of N-(2-aminoethyl)-2-aminoethanesulfonic acid (0.031 mol) and 2.9 g of diethanolamine (0.02 mol) in 76 g of water is added to the homogeneous solution whilst stirring leading to a volumetric content of 80% prior to destillation. After 7 minutes, dispersion (addition of water) and separation of the solvents by distillation are started at the same time. To this end 780 g of water heated to 65° C. are added in such a way that the volumetric content of the reaction vessel remains between 50 and 95 vol. %. A solvent-free, aqueous polyurethane-polyurea dispersion is obtained with a solids content of 40 wt. % at a volumetric content of 55% and an average particle size in the dispersed phase, determined by laser correlation, of 141 nm. The particle size distribution is largely monomodal (<5 wt. % of particles of the other particle size) and the d50 value determined by ultracentifugation measurement is 114 nm, whilst the non-uniformity value U90 is 0.49, i.e. well below that produced by the conventional acetone method, in which distillation takes place after dispersion (FIG. 1, top).

The space-time yield is increased by 38% in comparison to the PU dispersion (1) from Example 1 if the volumetric content is maintained at 80% prior to destillation.

A comparison of the U90 values determined by the ultracentrifugation method clearly shows that the particle size distribution of the PU dispersion produced by the method according to the invention (Example 2) is significantly narrower and more symmetrical as compared with the analogous dispersion produced by the prior art method (Example 1).

With otherwise comparable applicational properties, the PU dispersion from Example 2 produced by the method according to the invention has a significantly better thickening ability as compared with the prior art PU dispersion (Example 1).

TABLE 1

|  | Example 1 (comparison) | Example 2 (according to the invention) |
| --- | --- | --- |
| Solids content [%] | 40.6 | 40.2 |
| pH | 6.6 | 6.6 |

TABLE 1-continued

|  | Example 1 (comparison) | Example 2 (according to the invention) |
|---|---|---|
| Viscosity [mPas] | 186 | 198 |
| d50 [nm] | 105 | 114 |
| Peel strength on flexible PVC (65° C.) | | |
| 2-component initial [N/mm] | 5.4 | 5.3 |
| 2-component final [N/mm] | 10.2 | 10.4 |
| Initial heat resistance | | |
| Initial heat resistance test [mm/min] | 3.7 | 3.0 |
| Thickening ability [mPas] | 2000 | 3000 |

Example 3

Comparative Example: PU Dispersion (2) Based on the Standard Acetone Method 160 g of polyester 1,160 g polycarbonate polyol and 40 g polyether are dehydrated at 120° C. under vacuum for 1 hour in a 2.5 l vessel. 23.3 g of Desmodur® H are added at 80° C., followed by 15.3 g of Desmodur® I. The mixture is stirred at 80° C. until a constant isocyanate content of 0.90 to 1.01% is reached. The reaction mixture is dissolved in 800 g of acetone and cooled to 50° C. A solution of 5.80 g of sodium salt of N-(2-aminoethyl)-2-aminoethanesulfonic acid and 2.1 g of diethanolamine) in 55 g of water is added to the homogeneous solution whilst stirring. After 7 minutes, 565 g water are added at a temperature of 20° C. leading to a volumetric content of 80% prior to distillation. After distillation of acetone a solvent-free, aqueous polyurethane-polyurea dispersion is obtained with a solids content of 40 wt. % at a volumetric content of 40%. The particle size distribution is markedly bimodal. The maximum of the fine fraction in the particle size distribution was 71 nm, the maximum of the coarse fraction was 571 nm. The d50 value is 94 nm, whilst the non-uniformity value U90 is 6.0. The dispersion particles in the fine fraction had particle sizes of between 31 nm and 312 nm. The dispersion particles in the coarse fraction had particle sizes of between 313 nm and 1276 nm (FIG. 2).

Example 4

PU Dispersion (2) by Methods According to the Invention 221 g of polyester 1,221 g polyester and 55 g polyether are dehydrated at 120° C. under vacuum for 1 hour in a 2.5 l vessel. 32.2 g of Desmodur® H are added at 80° C., followed by 21.1 g of Desmodur® I. The mixture is stirred at 80° C. until a constant isocyanate content of 0.90 to 1.01% is reached. The reaction mixture is dissolved in 1104 g of acetone and cooled to 50° C. A solution of 8.0 g of sodium salt of N-(2-aminoethyl)-2-aminoethanesulfonic acid and 2.9 g of diethanolamine in 76 g of water is added to the homogeneous solution whilst stirring leading to a volumetric content of 80% prior to destillation. After 7 minutes, dispersion (addition of water) and separation of the solvents by distillation are started at the same time. To this end 780 g of water heated to 65° C. are added in such a way that the volumetric content of the reaction vessel remains between 50 and 95 vol. %. A solvent-free, aqueous polyurethane-polyurea dispersion is obtained with a solids content of 40 wt. % at a volumetric content of 55%. The particle size distribution is largely monomodal, i.e. the proportion of particles of the second modality is well below 5 wt. %. The maximum of the main fraction in the particle size distribution is 116 nm, whilst the maximum of the lesser fraction is 938 nm. The d50 value is 117 nm, whilst the non-uniformity value U90 is 1.73. (FIG. 3).

TABLE 2

|  | Example 4 (according to the invention) | Example 3 (comparison) |
|---|---|---|
| Characteristics | | |
| Solids content, % | 40.0 | 39.9 |
| Flow time, s | 15 | 16 |
| pH | 6.5 | 6.6 |
| d50 [nm] | 117 | 94 |
| Thickening ability, mPa * s | 5300 | 3000 |
| Film properties | | |
| 100% modulus | 1.7 | 1.8 |
| 0 value | 19.0/1130 | 20.1/1020 |
| 24 h storage in water | 13.0/870 | 12.5/720 |
| Swelling in EE | 266 | 342 |
| Swelling in water | 26 | 6 |

With otherwise comparable applicational properties, the PU dispersion (2) from Example 6 produced by the method according to the invention has a significantly higher thickening ability as compared with the prior art PU dispersion (Example 3).

The ultracentrifugation results (FIGS. 2 and 3) show that the particle size distribution of the PU dispersion (2) produced by the method according to the invention (Example 4) is significantly narrower as compared with the analogous dispersion produced by the prior art method (Example 3). Thus the U90 value for the dispersion produced by the method according to the invention is much lower at 1.73 than the U90 value from comparative example 3.

Example 5

Comparative Example, PU Dispersion (3) Based on the Standard Acetone Method from WO-A 2007/022885 (Example 1)

350.0 g of a difunctional polyester polyol based on adipic acid, 1,6-hexanediol (average molecular weight 1700 g/mol, OH value=approx. 66 mg KOH/g substance) were heated to 65° C. in a 2.5 l vessel. Then 60.1 g of hexamethylene diisocyanate were added within 5 minutes at 65° C. and the mixture was stirred at 100° C. until the theoretical NCO value of 3.2% was reached. The finished prepolymer was dissolved with 750 g of acetone at 50° C. and then a solution of 3.5 g of ethylene diamine, 9.9 g of sodium salt of N-(2-aminoethyl)-2-aminoethanesulfonic acid and 131.0 g of water was added within 5 minutes. The mixture was stirred for a further 15 minutes. Then it was dispersed within 10 minutes by adding 513.0 g of water leading to a volumetric content of 80%. This was followed by removal of the solvent by distillation under vacuum, and a stable PU dispersion having a solids content of 40.2% at a volumetric content of 40% and a particle size, determined by laser correlation spectroscopy, of 220 nm was obtained. The d50 value for the monomodal particle size distribution, determined by ultracentrifugation, is 173 nm, whilst the degree of non-uniformity U90 is 0.7. (FIG. 4).

Example 6

PU Dispersion (3) by Methods According to the Invention 469.0 g of a difunctional polyester polyol based on adipic acid, 1,6-hexanediol (average molecular weight 1700 g/mol, OH value=approx. 66 mg KOH/g substance) are heated to 65° C. in a 2.5 l vessel. Then 80.5 g of hexamethylene diisocyanate are added within 5 minutes at 65° C. and the mixture is stirred at 100° C. until the theoretical NCO value of 3.2% is reached. The finished prepolymer is dissolved with 1005 g of acetone at 50° C. and then a solution of 4.7 g of ethylene diamine, 13.3 g of sodium salt of N-(2-aminoethyl)-2-aminoethanesulfonic acid and 175.5 g of water is added within 5 minutes leading to a volumetric content of 80%. After 15 minutes, dispersion (addition of water) and separation of the solvents by distillation are started at the same time. To this end 687 g of water are added in such a way that the volumetric content of the reaction vessel remains between 50 and 95 vol. %. A solvent-free, aqueous polyurethane-polyurea dispersion is obtained with a solids content of 40.2 wt. % at a volumetric content of 55% and an average particle size in the dispersed phase, determined by laser correlation spectroscopy, of 179 nm. The particle size distribution, determined by ultracentrifugation, is very symmetrical, monomodal, and has a d50 value of 148 mm and a non-uniformity value U90 of 0.6. (FIG. 5).

The space-time yield is increased by 34% in comparison to the PU dispersion from Example 7.

TABLE 3

| | Example 6 (according to the invention) | Example 5 (comparison) |
|---|---|---|
| Characteristics | | |
| Solids content, % | 40.2 | 40.2 |
| Flow time, s | 15 | 15 |
| pH | 6.7 | 7.0 |
| d50 [nm] | 148 | 173 |
| Thickening ability, mPa * s | 5000 | 2700 |
| Film properties | | |
| 100% modulus | 2.1 | 1.9 |
| 0 value | 42.5/1500 | 40.9/1480 |
| 24 h storage in water | 25.3/1620 | 24.7/1730 |
| Swelling in EE | 259 | 100 |
| Swelling in water | 0 | 6 |

With otherwise comparable applicational properties, the PU dispersion (3) from Example 6 produced by the method according to the invention has a significantly better thickening ability and lower swelling in water as compared with the prior art PU dispersion (Example 5).

The ultracentrifugation results (FIGS. 4 and 5) show that the particle size distribution of the PU dispersion (3) produced by the method according to the invention (Example 6) is significantly narrower as compared with the analogous dispersion produced by the prior art method (Example 5), as is shown by a comparison of the U90 values of 0.7 (comparative example) and 0.6 (according to the invention).

Example 7

Comparative Example, PU Dispersion (4) Based on the Standard Acetone Method (Example 1/DE-A 2651506)

360.0 g of a difunctional polyester polyol based on adipic acid, 1,6-hexanediol and neopentyl glycol (average molecular weight 1700 g/mol, OH value=approx. 66 mg KOH/g substance) and 18.75 g of a polyether monoalcohol consisting of n-butanol, ethylene oxide and propylene oxide (in the molar ratio 83:17) with an OH value of 30 are heated to 65° C. in a 2.5 l vessel. Then 40.8 g of Desmodur® H and 53.87 g of Desmodur® I are added within 5 minutes at 65° C. and the mixture is stirred at 100° C. until the theoretical NCO value of 4.7% is reached. The finished prepolymer is dissolved with 700 g of acetone at 50° C. and then a solution of 2.21 g of hydrazine monohydrate, 6.58 g of sodium salt of N-(2-aminoethyl)-2-aminoethanesulfonic acid, 23.0 g of isophorone diamine and 57.0 g of water is added within 5 minutes. The mixture is stirred for a further 10 minutes. Then it is dispersed within 10 minutes by adding 500.0 g of water heated to 20° C. leading to a volumetric content of 80%. This was followed by removal of the solvent by distillation under vacuum, and a stable PU dispersion having a solids content of 50.3% at a volumetric content of 42% and a particle size, determined by laser correlation spectroscopy, of 198 nm is obtained. The particle size distribution, as is clear from the ultracentrifugation results, is bimodal: the maximum of the fine fraction of the particle size distribution was 114 nm, the maximum of the coarse fraction of the particle size distribution was 200 nm. The d50 value is 175 nm, whilst the non-uniformity value U90 is 0.97 (FIG. 6).

Example 8

PU Dispersion (4) by Methods According to the Invention 484.0 g of a difunctional polyester polyol based on adipic acid, 1,6-hexanediol and neopentyl glycol (average molecular weight 1700 g/mol, OH value=approx. 66 mg KOH/g substance) and 25.2 g of a polyether monoalcohol consisting of n-butanol, ethylene oxide and propylene oxide (in the molar ratio 83:17) with an OH value of 30 are heated to 65° C. in a 2.5 l vessel. Then 54.9 g of Desmodur® H and 72.5 g of Desmodur® I are added within 5 minutes at 65° C. and the mixture is stirred at 100° C. until the theoretical NCO value of 4.7% is reached. The finished prepolymer is dissolved with 942 g of acetone at 50° C. and then a solution of 2.97 g of hydrazine monohydrate, 8.85 g of sodium salt of N-(2-aminoethyl)-2-aminoethanesulfonic acid, 30.9 g of isophorone diamine and 77.0 g of water is added within 5 minutes leading to a volumetric content of 80%. After 10 minutes, dispersion (addition of water) and separation of the solvents by distillation are started at the same time. To this end 673 g of water heated to 60° C. are added in such a way that the volumetric content of the reaction vessel remains between 50 and 95 vol. %. A solvent-free, aqueous polyurethane-polyurea dispersion is obtained with a solids content of 50.3 wt. % at a volumetric content of 58% and an average particle size in the dispersed phase, determined by laser correlation, of 185 nm. The particle size distribution is symmetrically monomodal and has a d50 value of 168 mm and a non-uniformity value U90 of 0.38. (FIG. 7).

The space-time yield is increased by the method according to the invention (Example 8) by 34.5% in comparison to the prior art PU dispersion from Example 7.

TABLE 4

| Characteristics | Example 8 (according to the invention) | Example 7 (comparison) |
|---|---|---|
| Solids content, % | 50.3 | 50.3 |
| Flow time, s | 18 | 20 |
| pH | 7.2 | 7.2 |
| d50 [nm] | 168 | 175 |
| Thickening ability, mPa * s | 5300 | 3100 |
| Film properties | | |
| 100% modulus | 2.7 | 2.3 |
| 0 value | 30.9/980 | 22.0/1000 |
| 24 h storage in water | 12.4/1100 | 11.4/910 |
| Swelling in EE | 342 | 380 |
| Swelling in water | 6 | 13 |

The ultracentrifugation results (FIGS. 6 and 7) show that the particle size distribution of the PU dispersion (4) produced by the method according to the invention (Example 8) is significantly narrower as compared with the analogous dispersion produced by the prior art method (Example 7), as is shown by a comparison of the U90 values. The thickening ability is likewise significantly better, whilst the swelling in water is lower.

Example 9

Comparative Example to Example 6

The process for preparing PU dispersion (3) according to example 6 was carried out except for the fact that the addition of water with simultaneous distillation of acetone was carried out at a volumetric content below 40%. A solvent-free, aqueous polyurethane-polyurea dispersion is obtained with a solids content of 50 wt. % and an average particle size in the dispersed phase, determined by laser correlation, of 470 nm.

After filtration of the PU dispersion over a black filter paper the filter is covered with a white layer. Filtration of PU dispersion (3) according to the presently claimed invention does not lead to any residues on the filter paper.

The invention claimed is:

1. Method for producing aqueous polyurethane-polyurea dispersions, wherein in a first step (I) an isocyanate-functional prepolymer free from urea groups is produced by complete or partial reaction of compounds A) polyisocyanates,
B) polyols having number-average molecular weights of 400 to 8000 g/mol,
C') low-molecular-weight compounds having a molecular weight of 60 to 400, which in total have two or more hydroxyl groups,
D') optionally compounds having one hydroxyl group,
E) isocyanate-reactive, ionically or potentially ionically hydrophilising compounds,
F) isocyanate-reactive, non-ionically hydrophilising compounds, optionally already in at least one organic solvent, or in a second step (II), if not in step (I), this isocyanate-functional prepolymer is dissolved in at least one organic solvent in such a way that a solution of the isocyanate-functional prepolymer is produced in a concentration of 20 wt. % to 70 wt. %, relative to all components of the solution, in a third step (III) the optional addition of C") low-molecular weight compounds having a molecular weight of 32 to 400, which in total have two or more amino groups and/or hydroxyl groups, or
D") optionally compounds having one amino group takes place and then dispersion takes place by mixing water with the polymer solution with simultaneous distillation of the organic solvent in a dispersion and distillation unit, with the proviso that the volumetric content of the dispersion and distillation unit is 50 vol. % to 95 vol. %, and then a largely solvent-free polyurethane-polyurea dispersion having a residual content of organic solvent of 0.0 wt. % to 5 wt. % and a concentration of polyurethane-polyurea polymer particles of 20 wt. % to 70 wt %, relative in each case to all components of the polyurethane-polyurea dispersion, is obtained.

2. Method according to claim 1, characterised in that in step (I) the substance ratio of isocyanate groups to isocyanate-reactive groups is 1.0 to 3.5.

3. Method according to claim 1, characterised in that the reaction temperature in the first step is between 20 and 130° C.

4. Method according to claim 1, characterised in that acetone or 2-butanone is used as the organic solvent.

5. Method according to claim 1, characterised in that the volumetric content of the dispersion and distillation unit is 50 vol. % to 80 vol. %.

6. Method according to claim 1, characterised in that dispersion water heated to a constant temperature of 20 to 95° C. is used.

7. Method according to claim 1, characterised in that the temperature of the reaction mixture during the chain extension in step (III) is between 30 and 70° C.

* * * * *